(12) United States Patent
Lin et al.

(10) Patent No.: US 7,450,754 B2
(45) Date of Patent: Nov. 11, 2008

(54) RADIOMETRIC CALIBRATION FROM A SINGLE IMAGE

(75) Inventors: Stephen S. Lin, Beijing (CN); Heung-Yeung Shum, Bellevue, WA (US); Jinwei Gu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1016 days.

(21) Appl. No.: 10/809,167

(22) Filed: Mar. 23, 2004

(65) Prior Publication Data

US 2005/0213813 A1  Sep. 29, 2005

(51) Int. Cl.
*G06K 9/00* (2006.01)

(52) U.S. Cl. .................. 382/167; 382/162; 382/166; 382/274; 358/518

(58) Field of Classification Search .............. 382/162, 382/164, 165, 166, 167, 274; 358/518, 519, 358/520, 521, 522, 523; 345/589, 591–604
See application file for complete search history.

(56) References Cited

U.S. PATENT DOCUMENTS

| | | | |
|---|---|---|---|
| 6,208,753 B1 | 3/2001 | Braudaway et al. | |
| 6,437,823 B1 | 8/2002 | Zhang | |
| 6,639,594 B2 | 10/2003 | Zhang et al. | |
| 6,654,493 B1 * | 11/2003 | Hilliard et al. | 382/167 |
| 6,678,407 B1 | 1/2004 | Tajima | |
| 6,686,921 B1 | 2/2004 | Rushmeier et al. | |
| 2005/0104974 A1 * | 5/2005 | Watanabe et al. | 348/222.1 |
| 2005/0134599 A1 * | 6/2005 | Nayar et al. | 345/589 |

FOREIGN PATENT DOCUMENTS

| | | |
|---|---|---|
| EP | 0562971 | 9/1993 |
| EP | 1117070 | 7/2001 |

OTHER PUBLICATIONS

Michael D. Grossberg and Shree K. Nayar, "What is the Space of Camera Response Function", IEEE, 2003 Conference on Computer Vision and Pattern Recognition (CVPR 03), vol. II, p. 602, Jun. 18-20, 2003.
Carl Edward Rasmussen, "The Infinite Gaussian Mixture Model", Advances in Neural Information Processing Systems 12, MIT Press, pp. 554-560, 2000.

(Continued)

*Primary Examiner*—Matthew C. Bella
*Assistant Examiner*—Ali Bayat
(74) *Attorney, Agent, or Firm*—Lee & Hayes, PLLC

(57) ABSTRACT

A radiometric calibration system finds an inverse response function of a camera from a single digital image of a scene in which the actual colors of the scene are not known a priori. The system analyzes pixels of the image that correspond to an "edge" between two colors of the scene. These "edge" pixels represent a blended color formed from these two "component" colors, as measured by the camera. The system determines an inverse response function at least in part by: (a) finding suitable edge pixels; and (b) determining a function that maps the measured blended colors of edge pixels and their measured component colors into linear distributions. Reference data that includes predetermined inverse response functions of known cameras can be used in determining an inverse response function via a Bayesian Estimation.

11 Claims, 6 Drawing Sheets

OTHER PUBLICATIONS

Stephane Pauquet, "Bayesian Estimation", Bayesian Estimation Web, pp. 1-8, Oct. 2002.

Tsin et al., "Statistical Calibration of CCD Imaging Process", IEEE International Conference on Computer Vision, pp. 1-2 and 1-8, Jul. 2001.

Flynn, Radiometric Calibration Procedures for a Wideband Infrared Scene Projector (WISP), Technologies for Synthetic Environments, vol. 3697, pp. 265-273, Apr. 1999.

Bruegge, "MISR Prelaunch Instrument Calibration and Characterization Results", IEEE Transactions in Geoscience and Remote Sensing, vol. 36, No. 4, pp. 1186-1198, Jul. 1998.

Mermelstein, "Spectral and Radiometric Calibration of Midwave and Longwave Infrared Cameras", Optical Engineering, vol. 39, No. 2, pp. 347-352, Feb. 2000.

Demircan, "Use of a Wide Angle CCD Line Camera for BRDF Measurements", Infrared Physics and Technology, vol. 41, No. 1, pp. 11-19, Feb. 2000.

Campos, "Radiometric Calibration of Charge-Coupled-Device Video Cameras", Metrologia, vol. 37, No. 5, pp. 459-464, Oct. 2000.

Barun Singh and William T. Freeman, "Exploiting Spatial and Spectral Image Regularities for Color Constancy", MIT Computer Science and Artificial Intelligence Laboratory, pp. 1-19, Jul. 2003.

Paul E. Debevec and Jitendra Malik, "Recovering High Dynamic Range Radiance Maps from Photographs", SIGGRAPH 97, pp. 1-3 and 1-10, Aug. 1997.

Michael Grossberg and Shree K. Nayar, "What Can Be Known About the Radiometric Response from Images?", Computer Vision—ECCV 2002: 7th Edition, Conference on Computer Vision, pp. 1-2 and 1-16, May 2002.

Steve Mann and Richard Mann, "Quantigraphic Imaging: Estimating the Camera Response and Exposures From Differently Exposed Images", IEEE, pp. 1-8, Dec. 2001.

S. Mann and R. W. Picard, "On Being 'Undigital' With Digital Cameras: Extending Dynamic Range By Combining Differently Exposed Pictures", IS&T's 48th Annual Conference, pp. 422-428, May 1995.

Tomoo Mitsunaga and Shree K. Nayar, "Radiometric Self Calibration", IEEE, Computer Vision and Pattern Recognition, vol. 1, 1-8, Jun. 1999.

Shree K. Nayar and Tomoo Mitsunaga, "High Dynamic Range Imaging: Spatially Varying Pixel Exposures", Proceedings of IEEE Conference on Computer Vision and Pattern Recognition, pp. 1-9, Jun. 2000.

Barnard et al., "Camera Characterizaion for Colour Research" Colour research and Applications, vol. 27, No. 3, Jun. 2002, pp. 152-163.

Lin et al., "Radiometric Calibration from a Single Image" Proc. of IEEE Conference on Computer Vision and Pattern Recognition. vol. 2, Jun. 27, 2004, pp. 938-945.

EPO Communication with Search Report dated Jun. 20, 2006, from counterpart EP patent application, European Patent Application No. 05102186.3, copy attached, 3 pages.

* cited by examiner

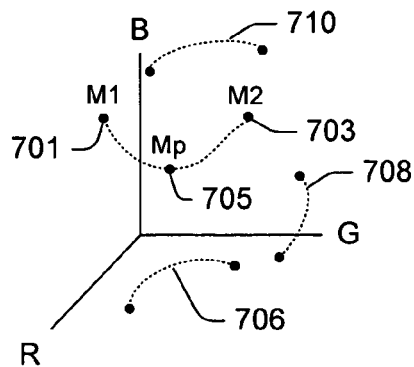 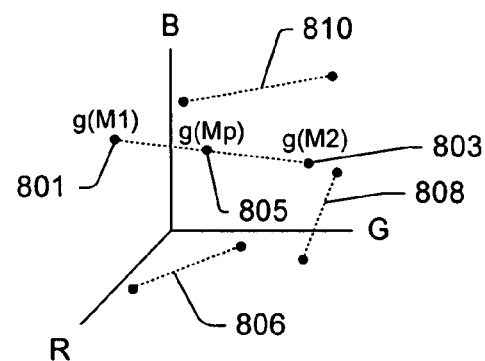
FIG. 7                FIG. 8
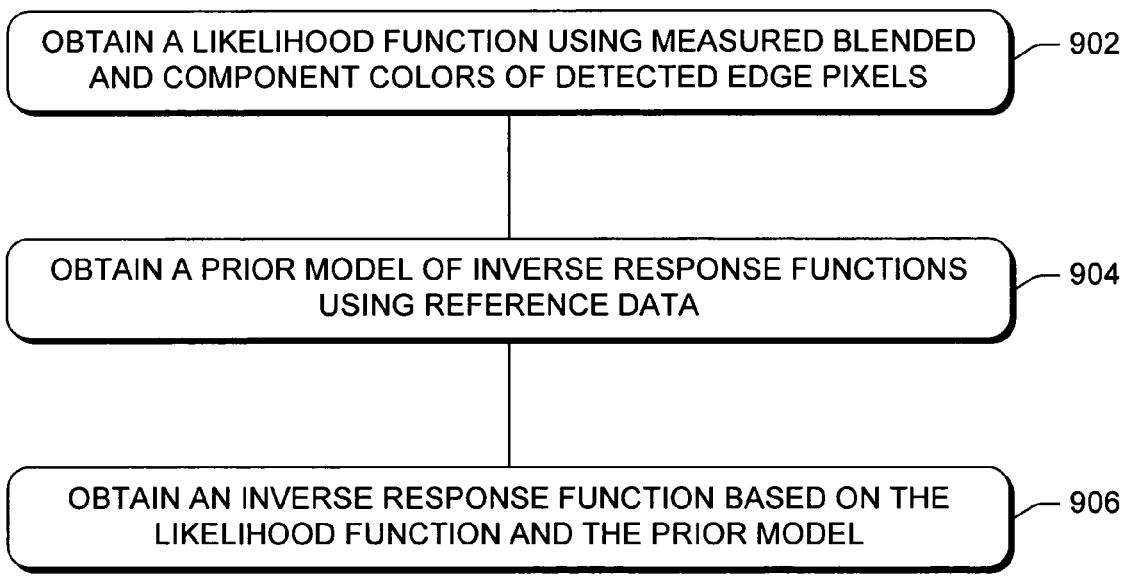
FIG. 9

RADIOMETRIC CALIBRATION FROM A SINGLE IMAGE

FIELD

Various embodiments described below relate generally to image processing, and more particularly but not exclusively to radiometric calibration of images.

BACKGROUND

In some applications, it is desired to calibrate an image capture device (e.g., a digital camera) so that the colors of the image (i.e., measured colors) will more accurately correspond to the actual colors (i.e., scene radiance) received by the image capture device (also referred to herein simply as a device).

FIG. 1 (Prior Art) shows an example of a system 100 that includes a digital camera 102 having a response function 104. In operation, digital camera 102 captures an image of a scene 106 (via its scene radiance) and outputs measured colors that are used to form a digital image 108. The measured colors of digital image 108 are related to the scene radiance by response function 104 (also referred to as the radiometric response). In general, response function 104 is non-linear and depends on the camera. Further, the response function can be different even if the cameras are the same model.

Camera 102 can be calibrated by finding the "inverse" of response function 104 so that, ideally, the measured colors will be mapped into colors exactly matching the scene radiance. In one type of approach, a user takes an image of a "reference" color scene (i.e., having regions of known color) so that the measured colors output by camera 102 can be compared to the actual colors. Thus, this type of approach requires an image of the "reference". In another type of approach, several images of a scene are required. In one particular approach, the series of images are taken under various precisely known exposure settings, with all of the images being registered (i.e., taken with the positions of the camera and scene being unchanged).

However, these conventional solutions have shortcomings in that in some scenarios, neither a "reference" image captured by the camera nor a series of registered images with different exposure settings may be available. For example, in some scenarios, only an image may be available, with no knowledge of the camera and the exposure setting used to capture the image.

SUMMARY

In accordance with aspects of the various described embodiments, systems and methods for radiometric calibration from a single image are provided. In one aspect, a system is used to calculate the inverse response function of a camera from a single digital image of a scene in which the actual colors of the scene are not known a priori. The system analyzes pixels of the image that correspond to an "edge" between two colors of the scene. Thus, these "edge" pixels represent a blended color formed from these two "component" colors, as measured by the camera. It can be shown that in the ideal case, such a blended color would lie on a line segment connecting its component colors in RGB color space. However, the response function of typical real cameras causes a measured blended color to be non-linear with respect to its measured component colors. In accordance with this aspect, the system determines an inverse response function at least in part by: (a) finding suitable edge pixels; and (b) determining a function that maps the measured blended colors of edge pixels and their measured component colors into linear distributions.

In another aspect, reference data that includes predetermined inverse response functions of known cameras is used in determining an inverse response function. In one embodiment that includes this aspect, Bayesian Estimation techniques are used to find an inverse response function.

BRIEF DESCRIPTION OF THE DRAWINGS

Non-limiting and non-exhaustive embodiments are described with reference to the following figures.

FIG. 7 is a diagram illustrating a measured color of an example edge pixel and measured colors of its component colors, in RGB space.

FIG. 8 is a diagram illustrating the resulting distribution after transforming the measured colors depicted in FIG. 7 using an inverse response function.

FIG. 9 is a flow diagram illustrating in more detail the operational flow depicted in FIG. 3 to determine a function that linearizes the measured blended colors, according to one embodiment.

DETAILED DESCRIPTION

Various embodiments are directed to method and system to calculate the inverse response function of a camera from a single digital image of a scene in which the actual colors of the scene are not known a priori. These embodiments analyze pixels of the image that correspond to an "edge" between two colors of the scene. The "edge" pixels have values that represent a blended color formed from these two "component" colors, as measured by the camera. The response function of the camera causes the measured blended color to be non-linear with respect to its measured component colors. The embodiments described below can determine an inverse response function at least in part by finding edge pixels and then determining a function that maps the blended colors of edge pixels and the measured component colors into linear distributions. Several embodiments are described below.

Figure 2:
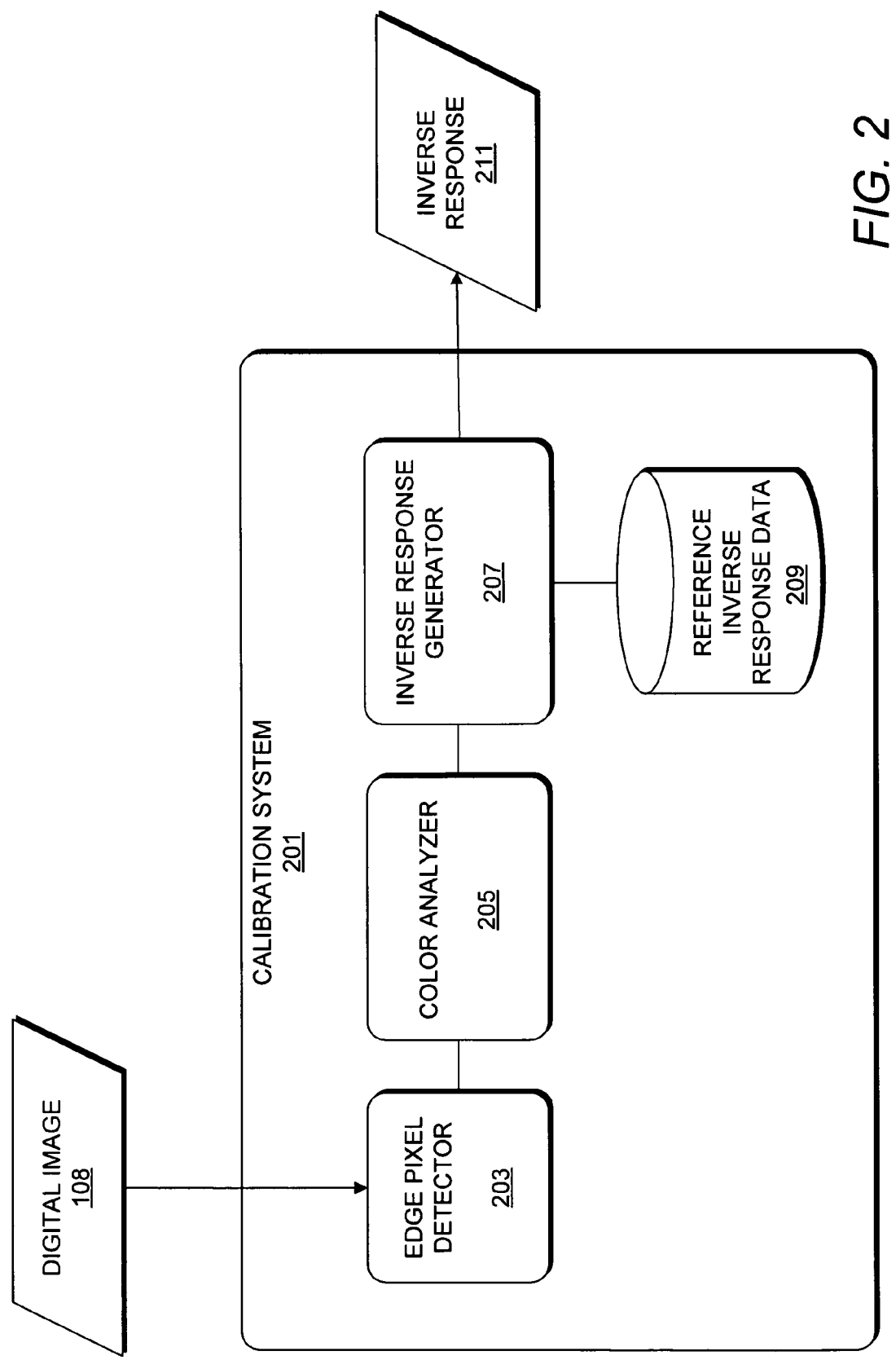
FIG. 2 is a block diagram of a system capable of determining an inverse response function from a single image, according to one embodiment.

FIG. 2 is a block diagram illustrating a calibration system 201 capable of determining an inverse response function from a single image, according to one embodiment. In this example, system 201 includes an edge pixel detector 203, a color analyzer 205, an inverse response estimator 207, and a datastore 209 that includes inverse response function data collected from several real cameras. This collection of inverse response data is also referred to herein as reference data. In one embodiment, the inverse response function data comprises the Database of Response Functions (DoRF) as described in Grossberg, M. D. and Nayar, S. K., What is the Space of Camera Response Functions, *Proc. IEEE Comp. Vision and Pattern Recognition (CVPR'03)—Vol. II*, June 2003, pp. 602-609. The above-described elements of calibration system 201 can be implemented as software components in some embodiments.

In one embodiment, edge pixel detector 203 is configured to find edge pixels in digital image 108 in which each of the pixels images one region having one color and another region having another color. Each of these pixels represents a blended color derived from two colors that serve as component colors of the blended color.

In one embodiment, color analyzer 205 is configured obtain measurements of the blended and component colors of the pixels found by edge pixel detector 203. Also, in this embodiment, inverse response estimator 207 is configured to generate an inverse response function that maps the measurements of the blended and component colors of the found pixels into a linear distribution. One embodiment of calibration system 201 operates as described below in conjunction with FIG. 3 to determine an inverse response function.

Figure 3:
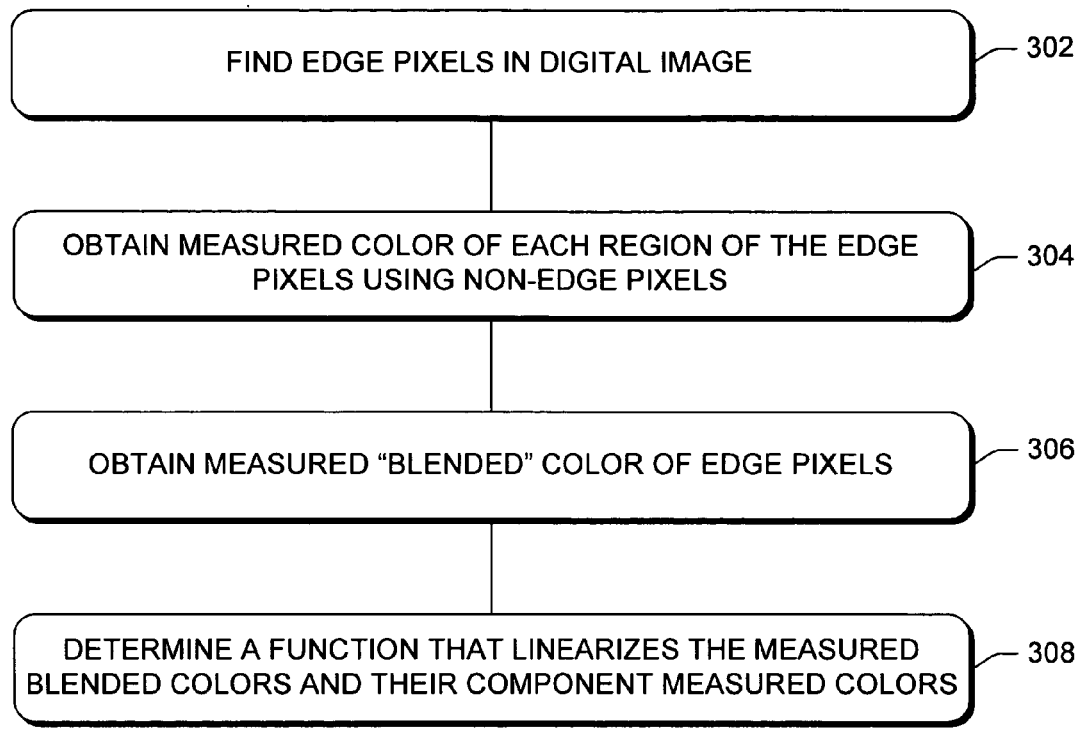
FIG. 3 is a flow diagram illustrating operational flow of the system of FIG. 1 in determining an inverse response function from a single image, according to one embodiment.

FIG. 3 illustrates operational flow of calibration system 201 (FIG. 2) in determining an inverse response function from a single image, according to one embodiment. This example operational flow is described below in conjunction with FIGS. 2 and 3.

Figure 1:
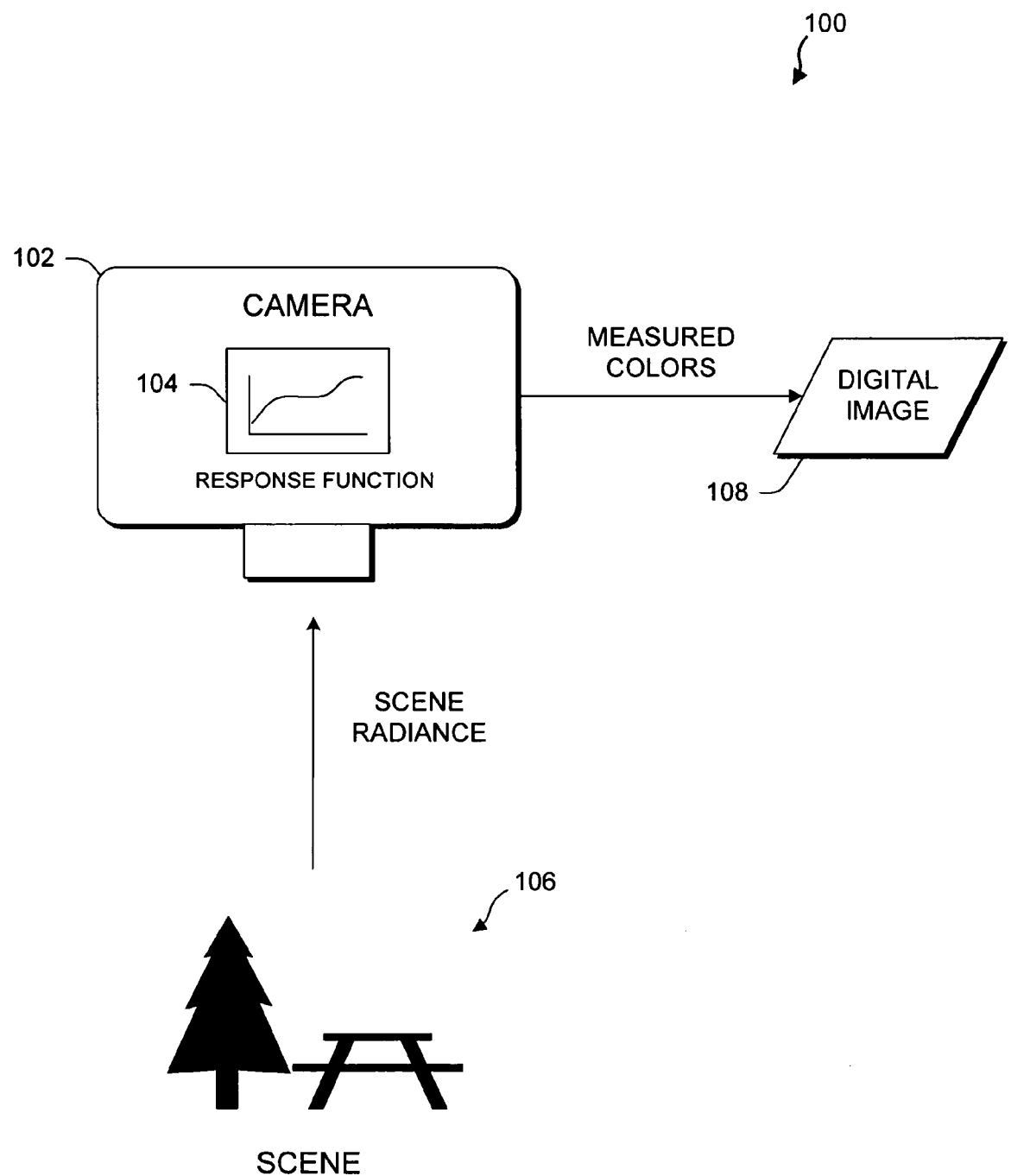
FIG. 1 (Prior Art) is a block diagram illustrating a camera taking a picture of a scene to produce a digital image.

In a block 302, system 201 finds edge pixels in digital image 108 (FIG. 1). In this embodiment, edge pixel detector 203 finds edge pixels in digital image 108 to form an observation set. As previously described, edge pixels are pixels that correspond to an "edge" between two colors of scene 106. The edge pixels have values that represent a blended color formed from these two "component" colors, as measured by the camera.

Figures 4, 5, 6:
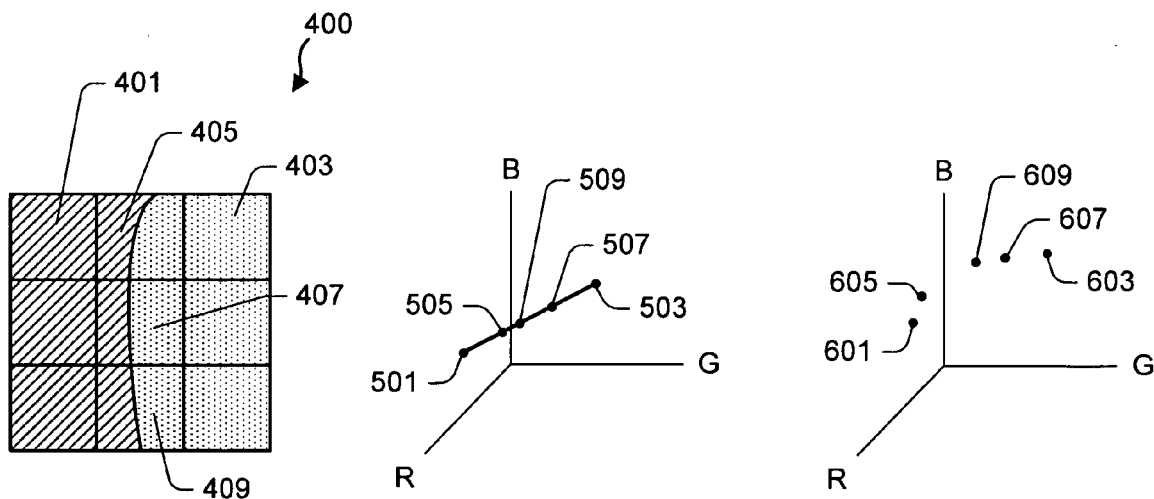
FIG. 4 is a diagram illustrating edge pixels in an image, which are used in determining an inverse response function from a single image, according to one embodiment.
FIG. 5 is a diagram illustrating the image irradiance of the pixels depicted in FIG. 4 in red-green-blue (RGB) color space.
FIG. 6 is a diagram illustrating the measured color of the pixels depicted in FIG. 4 in RGB color space.

Example edge pixels are illustrated in FIG. 4, which shows a three-by-three patch 400 of pixels. A pixel 401 in the upper left hand corner of patch 400 has a uniform color, indicated by "diagonal line" shading (referred to herein as the first color). In addition, the two pixels in patch 400 below pixel 401 have the same uniform first color. In contrast, a pixel 403 in the upper right corner of patch 400 has a different uniform color, which is indicated by "dot" shading (referred to herein as the second color). The two pixels below pixel 403 also have the same uniform second color. Pixels 405, 407 and 409 in the center column of patch 400 have regions of both the first and second colors and, thus, are referred to herein as edge pixels. The first and second colors are also referred to herein as component colors of edge pixel 405. Edge pixel 405 outputs a "blended" color formed from the combination of the first and second colors.

In one embodiment, edge pixel detector 203 includes a Canny edge detector (e.g., see Canny, J., A Computational Approach to Edge Detection, *IEEE Trans. Pattern Analysis and Machine Intelligence*, Vol. 8, No. 6, June 1986, pp. 679-698) to detect edge pixels. In other embodiments, different edge detectors can be used.

In a block 304, the measured color of each region of the edge pixels is obtained. In this embodiment, color analyzer 205 is configured to obtain the measured blended colors from each edge pixel using non-edge pixels having the same colors as the component colors in the edge pixels. For example, for edge pixel 405, color analyzer 205 can use the measured color of pixel 401 for the measured color of the first color region of edge pixel 405. Similarly, color analyzer 205 can use the measured color of pixel 403 for the measured color of the second color region of edge pixel 405.

Further, in this embodiment, color analyzer 205 determines whether an edge pixel is suitable for use in determining an inverse response function. For example, in one embodiment, color analyzer 205 determines whether: (a) the color variance (with respect Euclidean RGB distance) of the first and second colors are within a specified threshold (i.e., the first and second colors are sufficiently uniform); and (b) the mean colors of the first and second colors are at least a specified distance from each other (i.e., the first and second colors are separated enough to reduce the effect image noise). In addition, in this embodiment, an edge region (also referred to herein as an edge window) that contains edge pixels that have a blended color outside of the range delimited by the first and second colors are ignored. In other embodiments, color analyzer 205 can used different methods to obtain the measured colors of the component colors of the edge pixels.

In a block 306, the measured colors of the edge pixels are obtained. In this embodiment, color analyzer 205 is configured to obtain the measured blended color from each edge pixel. It can be shown that in the ideal case, a blended color will lie on a line segment connecting its component colors in RGB color space. An example is shown in FIG. 5, in which the edge pixels of FIG. 4 are plotted in RGB space. A point 501 represents the color of pixel 401 in RGB space and a point 503 represents the color of pixel 403 in RGB space. These colors are the component colors of the edge pixels in patch 400 (FIG. 4). A point 505 represents the color of edge pixel 405 in RGB color space; a point 507 represents the color of edge pixel 407 in RGB color space, and so on. As shown in FIG. 5, the colors of edge pixels 405, 407 and 409 (represented by points 505, 507 and 509, respectively) lie on a line segment connecting the colors of pixels 401 and 403 (represented by points 501 and 503, respectively).

However, in current commercially-available cameras, the measured color of an edge pixel is non-linear with respect to their measured component colors. An example is shown in FIG. 6. A point 601 represents the measured color of pixel 401 (FIG. 4) in RGB space, and a point 603 represents the measured color of pixel 403 (FIG. 4) in RGB space. These measured colors are the measured component colors of the edge pixels of patch 400 (FIG. 4). A point 605 represents the measured color of edge pixel 405 (FIG. 4) in RGB color space; a point 607 represents the measure color of edge pixel 407 in RGB color space, and so on. As shown in FIG. 6, the colors of edge pixels 405, 407 and 409 (represented by points 605, 607 and 609, respectively) lie on a curve segment connecting the measured colors of pixels 401 and 403 (represented by points 601 and 603, respectively).

In a block 308 (referring again to FIGS. 1 and 3), a function is determined that linearizes (e.g., maps the measured non-linear measure colors into a linear distribution in RGB color space) the measured blended colors and their component colors. In one embodiment, color analyzer 205 determines a function g that linearizes the measured blended and measured component colors. Further, in one embodiment, color analyzer 205 can be configured to normalize the domain and co-domain of linearizing function g so that $g(0)=0$ and $g(1)=1$ to account for scaling differences.

Further, in this embodiment, inverse response generator 207 then uses linearizing function g and reference data from datastore 209 to generate an inverse response function 211. In one embodiment, the reference data is used to interpolate and extrapolate linearizing function g over intervals of incomplete color data. In an alternative embodiment, linearizing function g can be used as the camera's inverse response function, so that inverse response generator 207 and datastore 209 need not be implemented. One embodiment of the operational flow in determining the inverse response function is described below in conjunction with FIG. 9. In this way, calibration system 201 can advantageously find an inverse response function from a single image. Further, the actual scene colors need not be known a priori. Thus, calibration system 201 does not require the camera, or multiple images captured by the camera, or any knowledge of the exposure settings used to capture the image, to find an inverse response function.

Although the above operational flow is described sequentially in conjunction with FIG. 3, in other embodiments, operations may be performed in different orders and/or in parallel.

A simplified example of linearizing the measured edge pixel colors is graphically illustrated in FIGS. 7 and 8. In FIG. 7, a point 701 represents the measured color of one component color of an edge pixel in RGB space (also referred to as M1). A point 703 represents the measured color the other component color (also referred to as M2) of the edge pixel in RGB space. A point 705 represents the measured blended color of the edge pixel (also referred to as Mp). As can be seen in FIG. 7, a curve connects points 701, 703 and 705 due to the non-linear response function of the camera used to capture the scene. Curves 706, 708 and 710 represent the distribution of measured colors of other edge pixels having different component colors than those of the measured blended color (Mp) represented by point 705. In a typical image, there would be many more such curves, but only these few are shown in FIG. 7 to avoid cluttering the figure.

As described above, color analyzer 205 then determines a function that linearizes the measured blended colors and the measured component colors. Ideally, the function maps the measured colors associated with each edge pixel (i.e., the measured component colors and the measured blended color) into a line segment.

An example is shown in FIG. 8, with the linearizing function referred to as function g. A point 801 represents the color of point 701 (FIG. 7) in RGB color space after transformation by linearizing function g. Stated another way, point 801 represents the color in RGB color space of the measured component color (i.e., M1) after application of linearizing function g; i.e., g(M1). Similarly, a point 803 represents the color in RGB color space of the other measured component color (i.e., M2) after application of linearizing function g; i.e., g(M2). A point 505 represents the color in RGB color space of the measured blended color (Mp) after transformation by linearizing function g; i.e., g(Mp). As shown in FIG. 8, the transformed measured colors M1, Mp and M2 (represented by points 801, 803 and 805, respectively) lie on a line segment. Similarly, curves 706, 708 and 710 of FIG. 7 are, ideally, transformed by linearizing function g into line segments 806, 808 and 810, respectively.

FIG. 9 is a flow diagram of the operational flow of block 308 (FIG. 3) in determining a function that linearizes the measured blended colors, according to one embodiment. In other embodiments, different approaches may be used to determine a linearizing function. Referring to FIGS. 2 and 3, one embodiment of block 308 includes an operational flow as follows.

In a block 902, a likelihood function is obtained using the measured blended colors and their corresponding measured component colors. In this embodiment, color analyzer 205 obtains this function. More particularly, in this embodiment, color analyzer 205 obtains the likelihood function based on the distance of each mapped blended color (Mp) to a line segment connecting its corresponding mapped component colors (M1 and M2). The Mp, M1 and M2 of an edge pixel are also referred to herein as an edge pixel triple. The distance of a mapped blended color, d(Mp), to the line segment that connects the blended color's mapped component colors can be determined from an edge pixel triple using equation 1 below.

$$d(Mp) = \frac{|[g(M1) - g(M2)] \times [g(Mp) - g(M2)]|}{|g(M1) - g(M2)|} \quad (1)$$

where × is the cross product operation between two vectors.

The sum of the distances of each mapped blended color, $D(g; \Omega)$, can be determined using equation 2 below.

$$D(g; \Omega) = \sum_{\Omega} \frac{|[g(M1) - g(M2)] \times [g(Mp) - g(M2)]|}{|g(M1) - g(M2)|} \quad (2)$$

where $\Omega$ is a set of edge pixel triples corresponding to the edge pixels previously found in block 302 (FIG. 3). In some alternative embodiments, equation 2 can be minimized to determine an inverse response function without using reference data. For example, equation 2 can be minimized using constraints that the resulting equation be both smooth and monotonic. However, in this embodiment, reference data is used to determine an inverse response function using Bayesian estimation techniques.

Bayesian estimation techniques can use prior model and likelihood function to determine a posterior distribution. In this embodiment, because the sum of distances is to be minimized, the likelihood function is formed by modeling the likelihood of an edge pixel triple $\Omega$ given an inverse response function g (i.e., $p(\Omega|g)$) as an exponential distribution using equation 2. Thus, this likelihood function can be defined using equation 3 below.

$$p(\Omega \mid g) = \frac{1}{Z} \exp(-\lambda D(g; \Omega)) \quad (3)$$

where Z is a normalization constant and $\lambda$ is set empirically to $10^4$. In other embodiments, different values for $\lambda$ can be used.

In a block 904, a prior model is obtained using the reference data from datastore 209. In this embodiment, inverse response generator 207 obtains a prior model by performing Principal Component Analysis (PCA) transformation on the aforementioned DoRF (i.e., the reference data) using five components (see e.g., Jollife, I. T., Principal Component Analysis, Springer Verlag, 1986). In one embodiment, inverse response generator 207 represents the reference data in terms of the first five principal components, as shown in equation 4 below.

$$g = g_0 + cH \quad (4)$$

where $g0=[g_{R0}, g_{G0}, G_{B0}]^T$ which is the mean inverse response; H is the matrix whose columns are composed of the first N=5 eigenvectors; and $C=[C_R, C_G, C_B]^T$ which is a coefficient vector in $R^{3 \times N}$ that represents an inverse response function $g=[g_R, g_G, g_B]^T$.

The inverse response generator 207, in this embodiment, then obtains the model by of the inverse response functions by forming a finite Gaussian mixture model (see e.g., McLachlan, G. J. and Basford, K. E., Mixture Models, Marcel Dekker, 1988) from the reference data in PCA form, as shown in equation 5.

$$p(g) = \sum_{i=1}^{K} \alpha_i \eta(g; \mu_i, \Sigma_i) \quad (5)$$

where the parameters $\alpha_i$ are the mixing proportions and $\eta(g; \mu_i, \Sigma_i)$ are the normalized Gaussians of g (equation 8). K is set equal to 5 in one embodiment, which was obtained empirically by using the expectation maximum (EM) algorithm (see e.g., Dempster, A. P., Laird. N. M. and Rubin, D. B. (1977) Maximum Likelihood from Incomplete Data via the EM algorithm (with Discussion), *JRSS*(B), Vol. 39, pp. 1-38).

In other embodiments, the model of equation 4 may be pre-computed using suitable custom or commercially-available PCA and EM algorithm tools and stored in datastore 209. In other embodiments, different techniques can be used to obtain the prior model.

In a block 906, an inverse response function is obtained using the above likelihood function and prior model. In this embodiment, inverse response generator 207 obtains the inverse response function. The optimal inverse response function g* is obtained by finding the maximum probability of the posterior distribution. The posterior distribution is defined in Bayesian estimation as the product of the prior model and the likelihood function. Thus, the optimal inverse response function g* can be found using equation 6 below, which is the maximum a posteriori (MAP) solution.

$$g^* = arg \max p(\Omega|g) p(g) \quad (6)$$

where $p(\Omega|g)$ and $p(g)$ are given as equations 3 and 5, respectively.

By taking the log of equation 6, g* can also be written as equation 7 below.

$$g^* = arg \min \lambda D(g;\Omega) - \log p(g) \quad (7)$$

which, in this embodiment, is computed by the Levenberg-Marquardt optimization algorithm (see e.g., Press, W. H., Teukolsky, S. A., Vetterling, W. T., Flannery, B. P., Numerical Recipes in C, Cambridge University Press, 1992), with the coefficients of g being initialized to zero. In other embodiments, different optimization algorithms can be used to find g*. In one embodiment, after the optimization algorithm converges, the result is refined sequentially in each dimension using a greedy local search (see e.g., Resende, M. G. C. and Ribeiro, C. C., Greedy randomized adaptive search procedures, in Handbook of Metaheuristics, F. Glover and G. Kochenberger, eds., Kluwer Academic Publishers, pp. 219-249, 2003).

Although the above operational flow is described sequentially in conjunction with FIG. 9, in other embodiments, operations may be performed in different orders and/or in parallel.

Figure 10:
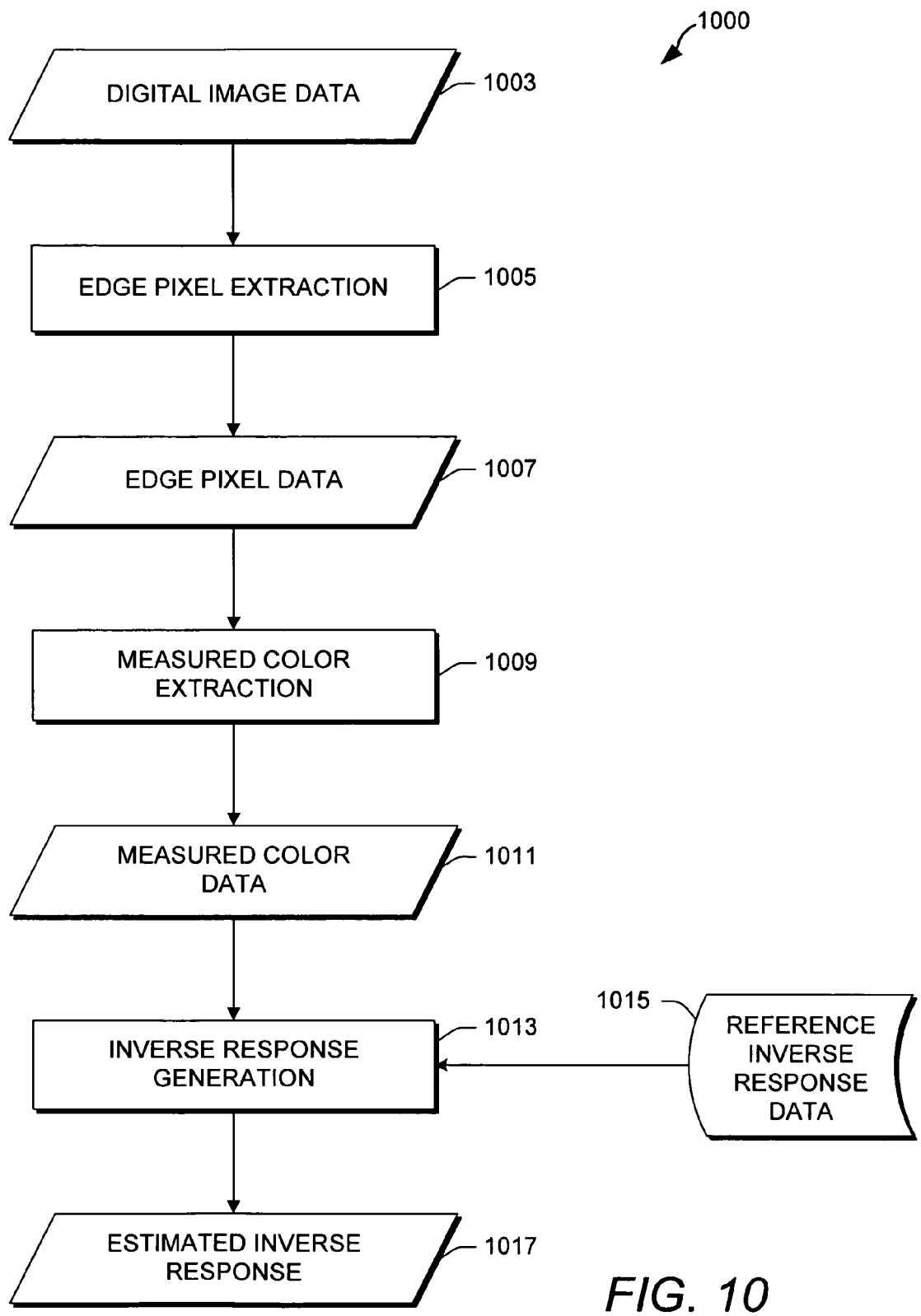
FIG. 10 is a data flow diagram illustrating data flow in determining an inverse response function from a single image, according to one embodiment.

FIG. 10 is a data flow diagram illustrating data flow 1000 in calibration system 201 (FIG. 2), according to one embodiment. Image data received from a camera flows through and is processed so that colors of the image can be adjusted, according to one embodiment as follows. Digital image data 1003 is received by an edge pixel extraction process 1005. In one embodiment, for example, edge detector 203 of calibration system 201 (FIG. 2) performs edge pixel extraction process 1005 on digital image data 1003 as described above in conjunction with block 302 (FIG. 3). Edge pixel extraction process 1005 outputs edge pixel data 1007, which identifies edge pixels that are suitable for further processing (e.g., the edge pixels whose edge window exhibits sufficient uniformity and separation of component colors).

A measured color extraction process 1009 is performed on edge pixel data 1007. In one embodiment, for example, color analyzer 205 (FIG. 2) performs color extraction process 1009 on edge pixel data 1007 to obtain the measured colors as described above in conjunction with blocks 304 and 306 (FIG. 3). Measured color extraction process 1009 outputs measured color data 1011. In one embodiment, edge pixel data 1007 comprises the aforementioned set $\Omega$ of edge pixel triples.

An inverse response generation process 1013 is then performed on measured color data 1011. In one embodiment, for example, inverse response generator 207 (FIG. 2) performs inverse response generation process 1013 using reference data 1015. In some alternative embodiments, inverse response generator 207 need not used reference data 1015. Reference data 1015 comprises inverse response data from real cameras and, in one example implementation, is retrieved from datastore 209 (FIG. 2). Inverse response generation process 1013, in one embodiment, is performed as described above in conjunction with block 308 and outputs an estimated inverse response 1017. In one embodiment, inverse response generation process 1013 uses Bayesian estimation techniques as described in conjunction with blocks 902, 904 and 906 (FIG. 9) to determine estimated inverse response 1017. Estimated inverse response 1017 can then be used to transform digital image data 1003 to produce an image with colors that more closely match the radiance of the captured scene.

Although the above data flow is described sequentially in conjunction with FIG. 10, in other embodiments, processes may be performed on the data in different orders and/or in parallel. Further, the processes of FIG. 10 may be performed by any suitable system or component, in addition to system 201 (FIG. 2) as in the above description.

The various embodiments described above may be implemented in computer environments of the calibration system (e.g., system 201 of FIG. 2). An example computer environment suitable for use in a calibration system is described below in conjunction with FIG. 11.

Figure 11:
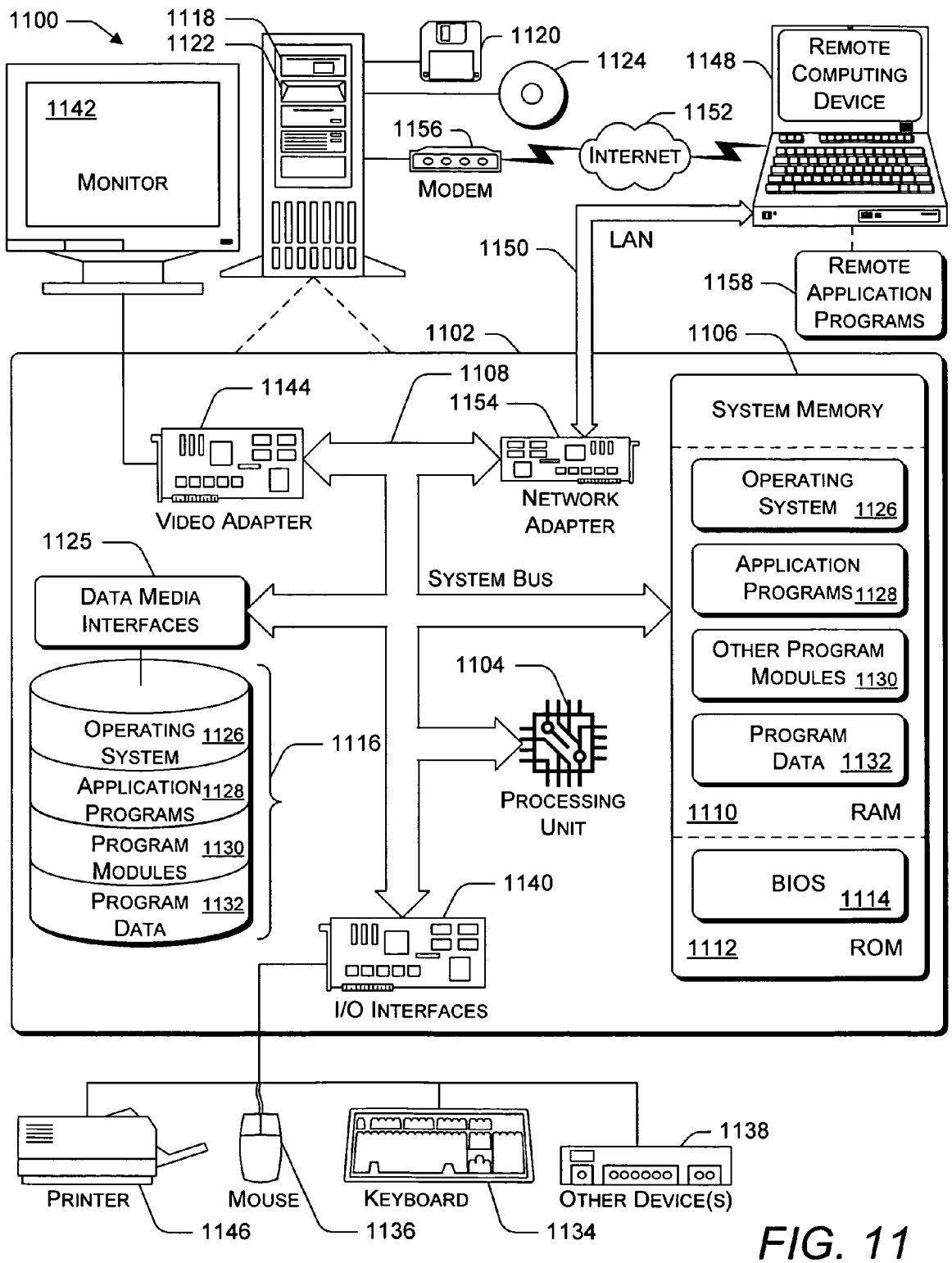
FIG. 11 is a block diagram illustrating an example computing environment suitable for practicing the above embodiments.

FIG. 11 illustrates a general computer environment 1100, which can be used to implement the techniques and/or components described herein. The computer environment 1100 is only one example of a computing environment and is not intended to suggest any limitation as to the scope of use or functionality of the computer and network architectures. Neither should the computer environment 1100 be interpreted as having any dependency or requirement relating to any one or combination of components illustrated in the example computer environment 1100.

Computer environment 1100 includes a general-purpose computing device in the form of a computer 1102. The components of computer 1102 can include, but are not limited to, one or more processors or processing units 1104, system memory 1106, and system bus 1108 that couples various system components including processor 1104 to system memory 1106.

System bus 1108 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394 (i.e., FireWire) bus.

Computer 1102 may include a variety of computer readable media. Such media can be any available media that is accessible by computer 1102 and includes both volatile and non-volatile media, removable and non-removable media.

System memory 1106 includes computer readable media in the form of volatile memory, such as random access memory (RAM) 1110; and/or non-volatile memory, such as read only memory (ROM) 1112 or flash RAM. Basic input/output system (BIOS) 1114, containing the basic routines that help to transfer information between elements within computer 1102, such as during start-up, is stored in ROM 1112 or flash RAM. RAM 1110 typically contains data and/or program modules that are immediately accessible to and/or presently operated on by processing unit 1104.

Computer 1102 may also include other removable/non-removable, volatile/non-volatile computer storage media. By way of example, FIG. 11 illustrates hard disk drive 1116 for reading from and writing to a non-removable, non-volatile magnetic media (not shown), magnetic disk drive 1118 for reading from and writing to removable, non-volatile magnetic disk 1120 (e.g., a "floppy disk"), and optical disk drive 1122 for reading from and/or writing to a removable, non-volatile optical disk 1124 such as a CD-ROM, DVD-ROM, or other optical media. Hard disk drive 1116, magnetic disk drive 1118, and optical disk drive 1122 are each connected to system bus 1108 by one or more data media interfaces 1125. Alternatively, hard disk drive 1116, magnetic disk drive 1118, and optical disk drive 1122 can be connected to the system bus 1108 by one or more interfaces (not shown).

The disk drives and their associated computer-readable media provide non-volatile storage of computer readable instructions, data structures, program modules, and other data for computer 1102. Although the example illustrates a hard disk 1116, removable magnetic disk 1120, and removable optical disk 1124, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 1116, magnetic disk 1120, optical disk 1124, ROM 1112, and/or RAM 1110, including by way of example, operating system 1126, one or more application programs 1128, other program modules 1130, and program data 1132. Each of such operating system 1126, one or more application programs 1128, other program modules 1130, and program data 1132 (or some combination thereof) may implement all or part of the resident components that support the distributed file system.

A user can enter commands and information into computer 1102 via input devices such as keyboard 1134 and a pointing device 1136 (e.g., a "mouse"). Other input devices 1138 (not shown specifically) may include a microphone, joystick, game pad, satellite dish, serial port, scanner, and/or the like. These and other input devices are connected to processing unit 1104 via input/output interfaces 1140 that are coupled to system bus 1108, but may be connected by other interface and bus structures, such as a parallel port, game port, or a universal serial bus (USB).

Monitor 1142 or other type of display device can also be connected to the system bus 1108 via an interface, such as video adapter 1144. In addition to monitor 1142, other output peripheral devices can include components such as speakers (not shown) and printer 1146, which can be connected to computer 1102 via I/O interfaces 1140.

Computer 1102 can operate in a networked environment using logical connections to one or more remote computers, such as remote computing device 1148. By way of example, remote computing device 1148 can be a PC, portable computer, a server, a router, a network computer, a peer device or other common network node, and the like. Remote computing device 1148 is illustrated as a portable computer that can include many or all of the elements and features described herein relative to computer 1102. Alternatively, computer 1102 can operate in a non-networked environment as well.

Logical connections between computer 1102 and remote computer 1148 are depicted as a local area network (LAN) 1150 and a general wide area network (WAN) 1152. Such networking environments are commonplace in offices, enterprise-wide computer networks, intranets, and the Internet.

When implemented in a LAN networking environment, computer 1102 is connected to local network 1150 via network interface or adapter 1154. When implemented in a WAN networking environment, computer 1102 typically includes modem 1156 or other means for establishing communications over wide network 1152. Modem 1156, which can be internal or external to computer 1102, can be connected to system bus 1108 via I/O interfaces 1140 or other appropriate mechanisms. It is to be appreciated that the illustrated network connections are examples and that other means of establishing at least one communication link between computers 1102 and 1148 can be employed.

In a networked environment, such as that illustrated with computing environment 1100, program modules depicted relative to computer 1102, or portions thereof, may be stored in a remote memory storage device. By way of example, remote application programs 1158 reside on a memory device of remote computer 1148. For purposes of illustration, applications or programs and other executable program components such as the operating system are illustrated herein as discrete blocks, although it is recognized that such programs and components reside at various times in different storage components of computing device 1102, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method for determining an inverse response function of a camera, the method comprising:

finding a first pixel in an output image of the camera in which the first pixel images a first region having a first color and a second region having a second color, the first pixel representing a blended color derived from the first and second colors, wherein the first and second colors serve as component colors of the blended color;

obtaining the camera's measurements of the first and second colors;

obtaining the camera's measurement of the blended color; and finding a function that maps the measurements of the first, second and blended colors into a linear distribution in a color space.

2. The method of claim 1, further comprising:

finding a plurality of pixels in the output image in which each pixel of the plurality of pixels images two regions of different colors and represents a blended color derived from the different colors, wherein the different colors of each pixel serve as component colors of that pixel's blended color;

obtaining the camera's measurements of the different colors of each pixel of the plurality of pixels;

obtaining the camera's measurement of the blended colors of the plurality of pixels; and finding a function that maps the measurements of the colors of the first pixel and the plurality of pixels into a linear distribution in the color space.

3. The method of claim 2, wherein finding a function that maps the measurements of the colors of the first pixel and the plurality of pixels into a linear distribution further comprises determining the function with dependence on predetermined response functions of known cameras.

4. The method of claim 3, further comprising modeling the predetermined response functions as a Gaussian mixture model.

5. The method of claim 2, further comprising finding a maximum a posteriori (MAP) solution formulated as the product of a prior model and a likelihood function, wherein the prior model is a Gaussian mixture model derived from predetermined response functions, and the likelihood function is an exponential distribution function derived from distances of each mapped blended color measurement to a line segment connecting the blended color's mapped component colors in the color space, the inverse response function being derived from the MAP solution.

6. The method of claim 1, wherein the measurement of the first color is obtained from a second pixel that images only the first color.

7. The method of claim 1, wherein the second pixel is adjacent to the first pixel.

8. The method of claim 1, wherein finding a function that maps the measurements of the first, second and third colors into a linear distribution further comprises determining a distance function that minimizes a sum of distances of each mapped blended color measurement to a line segment connecting the blended color's mapped component colors in the color space.

9. The method of claim 8, further comprising incorporating the distance function into an exponential distribution function.

10. The method of claim 1, further comprising using a Bayesian estimation algorithm to determine the function.

11. A computer readable storage medium having instructions for performing the method of claim 1.

* * * * *